(12) United States Patent
Mori et al.

(10) Patent No.: US 10,700,512 B2
(45) Date of Patent: Jun. 30, 2020

(54) TRANSMITTING AND RECEIVING CIRCUIT

(71) Applicant: Murata Manufacturing Co., Ltd., Nagaokakyo-shi, Kyoto-fu (JP)

(72) Inventors: Takahiro Mori, Nagaokakyo (JP); Tadashi Washimori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 324 days.

(21) Appl. No.: 15/903,062

(22) Filed: Feb. 23, 2018

(65) Prior Publication Data

US 2018/0248360 A1    Aug. 30, 2018

(30) Foreign Application Priority Data

Feb. 28, 2017    (JP) ................. 2017-035738

(51) Int. Cl.
*H02H 7/20*    (2006.01)
*H02H 9/04*    (2006.01)
(Continued)

(52) U.S. Cl.
CPC .......... *H02H 7/20* (2013.01); *H01C 8/04* (2013.01); *H02H 9/041* (2013.01);
(Continued)

(58) Field of Classification Search
CPC ... H02H 7/20; H02H 9/041; H04J 1/08; H04J 1/045; H04N 21/615; H04N 21/40;
(Continued)

(56) References Cited

U.S. PATENT DOCUMENTS 5,859,758 A    1/1999    Kim
6,957,047 B1 *    10/2005    Young .................. H04B 1/18
                                                                                  455/115.1
(Continued)

FOREIGN PATENT DOCUMENTS

JP    10-163423 A    6/1998
JP    2003-18744 A    1/2003
(Continued)

OTHER PUBLICATIONS

Erreygers, Jan; Network interface unit with selectable upstream and downstream frequency bands; Date: Jun. 2, 2016; Drwawings, and abstract, specification (Year: 2016).*

(Continued)

*Primary Examiner* — Dharti H Patel
(74) *Attorney, Agent, or Firm* — Keating & Bennett, LLP

(57) ABSTRACT

A transmitting and receiving circuit that transmits and receives signals using coaxial cables includes an input/output terminal that delivers and receives signals, a first port, a second port, a switch, and a ceramic-based electro-static discharge protector. The first port transfers a transmitted signal in a first transmission frequency band width and a received signal in a first reception frequency band width. The second port transfers a transmitted signal in a second transmission frequency band width and a received signal in a second reception frequency band width. The switch connects a common port to one of the first port and the second port. The common port is connected to the input/output terminal on one end of the common port and to the switch on the other end. The electro-static discharge protector is connected between the common port and the ground potential.

18 Claims, 5 Drawing Sheets

(51) Int. Cl.
*H04B 1/04* (2006.01)
*H04N 21/40* (2011.01)
*H01C 8/04* (2006.01)
*H04H 20/78* (2008.01)
*H04J 1/04* (2006.01)
*H04B 1/40* (2015.01)
*H04H 40/27* (2008.01)
*H04N 21/61* (2011.01)
*H04J 1/08* (2006.01)

(52) U.S. Cl.
CPC ............ *H04B 1/0466* (2013.01); *H04B 1/40* (2013.01); *H04H 20/78* (2013.01); *H04H 40/27* (2013.01); *H04J 1/045* (2013.01); *H04J 1/08* (2013.01); *H04N 21/40* (2013.01); *H04N 21/615* (2013.01)

(58) Field of Classification Search
CPC .......... H04H 40/27; H04H 20/78; H01C 8/04; H04B 1/40; H04B 1/0466
USPC .......................................................... 361/56
See application file for complete search history.

(56) References Cited

U.S. PATENT DOCUMENTS

| | | | |
|---|---|---|---|
| 10,182,505 B2 * | 1/2019 | Ochii | ............... H04B 1/38 |
| 2012/0236450 A1 | 9/2012 | Adachi | |
| 2015/0295595 A1 | 10/2015 | Uejima | |
| 2018/0102748 A1 * | 4/2018 | Li | ............... H03F 3/19 |

FOREIGN PATENT DOCUMENTS

| | | |
|---|---|---|
| JP | 2012-209244 A | 10/2012 |
| JP | 2016-184962 A | 10/2016 |
| WO | 2014/188791 A1 | 11/2014 |
| WO | 2016/083356 A1 | 6/2016 |

OTHER PUBLICATIONS

Official Communication issued in corresponding Japanese Patent Application No. 2017-035738, dated May 7, 2019.

* cited by examiner

FIG. 5
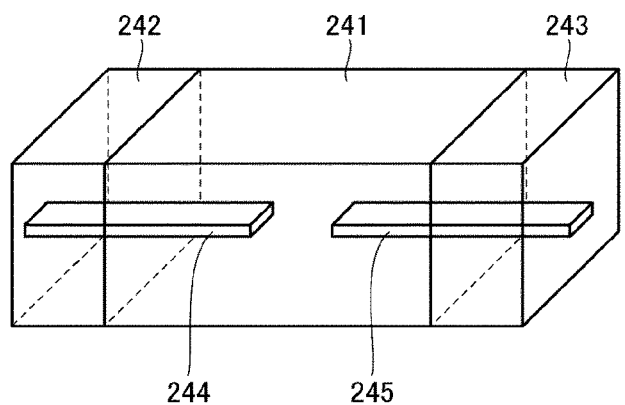
FIG. 6
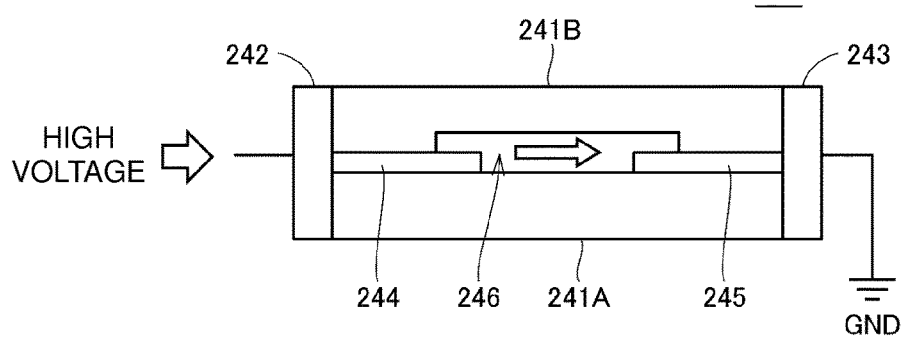
FIG. 7
|  | COMPARATIVE EXAMPLE | EMBODIMENT |
|---|---|---|
| LEAKAGE SURGE VOLTAGE (V) | 710 | 330 |
FIG. 8
|  | INPUT (40MHz) | SECOND-ORDER HARMONIC (80MHz) | THIRD-ORDER HARMONIC (120MHz) | SYSTEM NOISE |
|---|---|---|---|---|
| SIGNAL LEVEL (dBm) | 20 | −122 | −120 | −130 |

TRANSMITTING AND RECEIVING CIRCUIT

CROSS REFERENCE TO RELATED APPLICATIONS

This application claims the benefit of priority to Japanese Patent Application No. 2017-035738 filed on Feb. 28, 2017. The entire contents of this application are hereby incorporated herein by reference.

BACKGROUND OF THE INVENTION

1. Field of the Invention

The present invention relates to a transmitting and receiving circuit and particularly relates to electro-static discharge (ESD) protection in a transmitting and receiving circuit.

2. Description of the Related Art

Cable television (CATV) systems that transmit and receive television signals and the like by using wired communication lines have been known, and some CATV systems use a wiring system called a hybrid fiber-coaxial (HFC) system. In the HFC system, an optical cable is used for wiring from a CATV station to the trunk portion of a transmission line, and a coaxial cable is used for wiring for a branch line portion from the trunk to each of customer premises.

In a CATV system using the HFC system, for example, a lightning strike near the system or on a power cable causes a lightning surge (about 3 kV or higher) to enter a set top box (STB) including a transmitting and receiving circuit from the input/output terminal of the STB via the coaxial cable in some cases. If the lightning surge as described above enters the STB, there is a possibility of a dielectric breakdown of a device included in the transmitting and receiving circuit.

To prevent an influence of the lightning surge, a protector, such as an arrester, is typically provided between the input/output terminal of the STB and the transmitting and receiving circuit of the STB in some cases, as disclosed in Japanese Unexamined Patent Application Publication No. 2003-18744.

The arrester as described above eliminates a high voltage surge of about several kV, but a lower surge voltage (for example, about 700 V) might enter the transmitting and receiving circuit as a leakage surge voltage.

To address such a low voltage surge, a semiconductor-based electro-static discharge protection circuit for a semiconductor as disclosed in Japanese Unexamined Patent Application Publication No. 10-163423 may be used.

In the HFC system, facilities conforming to the Data-Over-Cable Service Interface Specification (DOCSIS) standard are typically used. There are a plurality of versions of the DOCSIS standard due to the improvement of an available frequency band and a communication speed, and thus, an apparatus conforming to the plurality of versions of the DOCSIS standard exists. In this case, when the apparatus is used, switchover of filters is necessary in accordance with a used frequency band width of the corresponding version. A semiconductor switch for switchover is thus provided in the transmitting and receiving circuit in some cases.

To protect the semiconductor switch from the leakage surge voltage, a transient voltage suppression circuit (hereinafter, also referred to as a transient voltage suppression (TVS)) may be used as a semiconductor-based electro-static discharge protection circuit including diodes.

However, a semiconductor-based protection circuit, such as the TVS, has non-linear load characteristics, and thus, using the semiconductor-based protection circuit for a high frequency signal might lead to harmonic distortion caused by a harmonic with a frequency that is an integer multiple of the frequency of a passing signal. Accordingly, when the TVS is used, a filter for eliminating harmonic distortion must be provided subsequent to the TVS.

In addition, in the apparatus conforming to the plurality of versions of the standard as described above, for example, the frequency of a harmonic component of a transmission frequency signal might overlap with the reception frequency band width. In this case, providing a filter for distortion elimination for a common port through which both of a transmitted signal and a received signal pass consequently prevents the received signal from being received. Accordingly, it is not possible to use the TVS under the circumstances as described above and, thus, not possible to appropriately protect the semiconductor switch for switchover from the leakage surge voltage.

SUMMARY OF THE INVENTION

Preferred embodiments of the present invention appropriately protect a semiconductor switch for switchover from a leakage surge voltage without influencing transmitted and received signals, the semiconductor switch being included in a transmitting and receiving circuit for CATV.

According to a preferred embodiment of the present invention, a transmitting and receiving circuit that transmits and receives signals using a coaxial cable includes an input/output terminal that delivers and receives signals from the coaxial cable, a first port, a second port, a first switch, and a first electro-static discharge protector that is ceramic-based. The first port transfers a transmitted signal in a first transmission frequency band width and a received signal in a first reception frequency band width. The second port transfers a transmitted signal in a second transmission frequency band width and a received signal in a second reception frequency band width. The first switch connects a common port to one of the first port and the second port. The common port is connected to the input/output terminal on one end of the common port and to the first switch on the other end. The first electro-static discharge protector is connected between the common port and a ground potential.

Preferably, the transmitting and receiving circuit further includes a surge protector connected between the input/output terminal and the common port, and is structured to guide, to the ground potential, a surge voltage entering from the input/output terminal.

Preferably, the transmitting and receiving circuit further includes a transmission port that transfers a transmitted signal, a reception port that transfers a received signal, a second switch, and a third switch. The second switch connects the transmission port to one of the first port and the second port. The third switch connects the reception port to one of the first port and the second port.

Preferably, the transmitting and receiving circuit further includes a first filter unit and a second filter unit. The first filter unit allows the transmitted signal in the first transmission frequency band width to pass through the first filter unit and outputs the transmitted signal to the first port. The transmitted signal is included in transmitted signals from the transmission port. The first filter unit also allows the received signal in the first reception frequency band width to pass through the first filter unit and outputs the received signal to the reception port. The received signal is included in signals from the first port. The second filter unit allows the transmitted signal in the second transmission frequency band width to pass through the second filter unit and outputs the transmitted signal to the second port. The transmitted signal is included in transmitted signals from the transmission port. The second filter unit also allows the received signal in the second reception frequency band width to pass through the second filter unit and outputs the received signal to the reception port. The received signal is included in signals from the second port.

Preferably, the transmitting and receiving circuit further includes second electro-static discharge protectors that are semiconductor-based and each of which is provided on a corresponding one of a path connecting the second switch and the first filter unit, a path connecting the second switch and the second filter unit, and a path connecting the reception port and the third switch.

Preferably, each second electro-static discharge protector includes an input terminal, an output terminal connected to the ground potential, a first diode, a second diode, a first Zener diode, and a second Zener diode. The first diode and the first Zener diode include respective anodes that are connected to each other. The second diode and the second Zener diode include respective anodes that are connected to each other. A cathode of the first diode and a cathode of the second Zener diode are connected to the input terminal. A cathode of the second diode and a cathode of the first Zener diode are connected to the output terminal.

Preferably, the first electro-static discharge protector includes a first electrode, a second electrode connected to the ground potential, a first ceramic layer, and a second ceramic layer laminated on the first ceramic layer such that a space is provided in a portion between the first ceramic layer and the second ceramic layer. The first electrode and the second electrode are arranged between the first ceramic layer and the second ceramic layer such that the first electrode and the second electrode are spaced away from and face each other in the space. When a voltage equal to or higher than a predetermined voltage is applied to the first electrode, current flows from the first electrode to the second electrode.

Preferably, the transmitting and receiving circuit is used for a set top box for cable television (CATV), for example. The first transmission frequency band width and the first reception frequency band width preferably are frequency band widths conforming to a standard that is Data-Over-Cable Service Interface Specification (DOCSIS) 3.0. The second transmission frequency band width and the second reception frequency band width are frequency band widths conforming to a standard that is DOCSIS 3.1.

According to a preferred embodiment of the present invention, in a transmitting and receiving circuit for CATV including a semiconductor switch, a ceramic-based electro-static discharge protector that does not easily cause harmonic distortion is preferably used as an electro-static discharge protection circuit. This eliminates the need for additionally providing a filter to eliminate harmonic distortion, unlike a semiconductor-based electro-static discharge protection circuit, such as a TVS. Accordingly, it is possible to appropriately protect the semiconductor switch from a leakage surge voltage without influencing transmitted and received signals.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a first diagram for explaining a ceramic-based electro-static discharge protector.

FIG. 6 is a second diagram for explaining the ceramic-based electro-static discharge protector.

FIG. 7 is a table illustrating leakage surge voltages in a preferred embodiment of the present invention and a comparative example.

FIG. 8 is a table illustrating the levels of harmonic distortion observed when a high frequency signal is input in a preferred embodiment of the present invention.

DETAILED DESCRIPTION OF THE PREFERRED EMBODIMENTS

Figure 1:
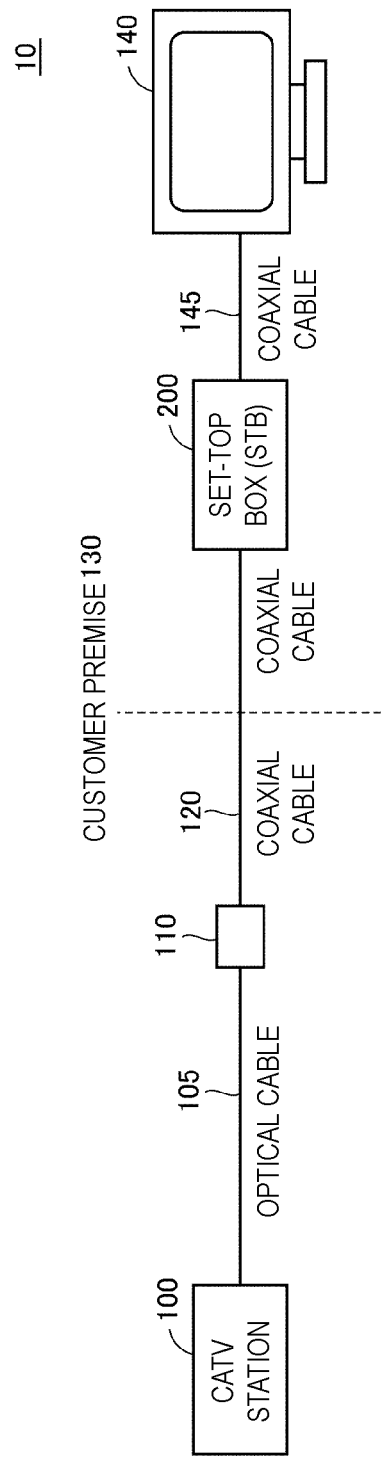
FIG. 1 is an overall schematic diagram of a CATV system.

Hereinafter, preferred embodiments of the present invention will be described in detail with reference to the drawings. Note that the same or equivalent components in the drawings are denoted by the same reference numerals, and description thereof is not repeated.

FIG. 1 is an overall schematic diagram of a CATV system including a STB 200 including a transmitting and receiving circuit according to a preferred embodiment of the present invention.

In FIG. 1, the CATV system 10 transfers a transmitted signal, such as a television signal transmitted from a CATV station 100, to a customer premise 130 through an optical cable and coaxial cables. The transferred transmitted signal is received by the STB 200 and undergoes branching filter processing, and video is displayed on a display device 140, such as a television receiver, a monitor, or other suitable display device.

The CATV system 10 is also used for a network for the Internet. In this case, the CATV system 10 transfers, to the CATV station 100, a signal transmitted from a user via the display device 140 or a computer (not illustrated). As described above, the CATV system 10 enables two-way communications between the CATV station 100 and the customer premise 130.

The CATV system 10 according to the present preferred embodiment uses a HFC system. In the HFC system, an optical cable 105 is used to provide wiring from the CATV station 100 to the trunk portion of the transmission line, and a coaxial cable 120 is used to provide wiring from the trunk to the branch line portion of each of customer premises 130. A transmitted signal transferred from the CATV station 100 via the network using the optical cable 105 is converted from an optical signal to an electric signal by a transducer 110 installed near the customer premise 130. The converted signal is transferred to the STB 200 installed in the customer premise 130 through the coaxial cable 120.

The STB 200 is typically a cable modem. The STB 200 extracts a signal in a predetermined frequency band width from received signals and outputs the signal to the display device 140 through a coaxial cable 145. The STB 200 transmits, at a transmission frequency in a predetermined frequency band width, a signal received from the display device 140 to the CATV station 100.

Figure 2:
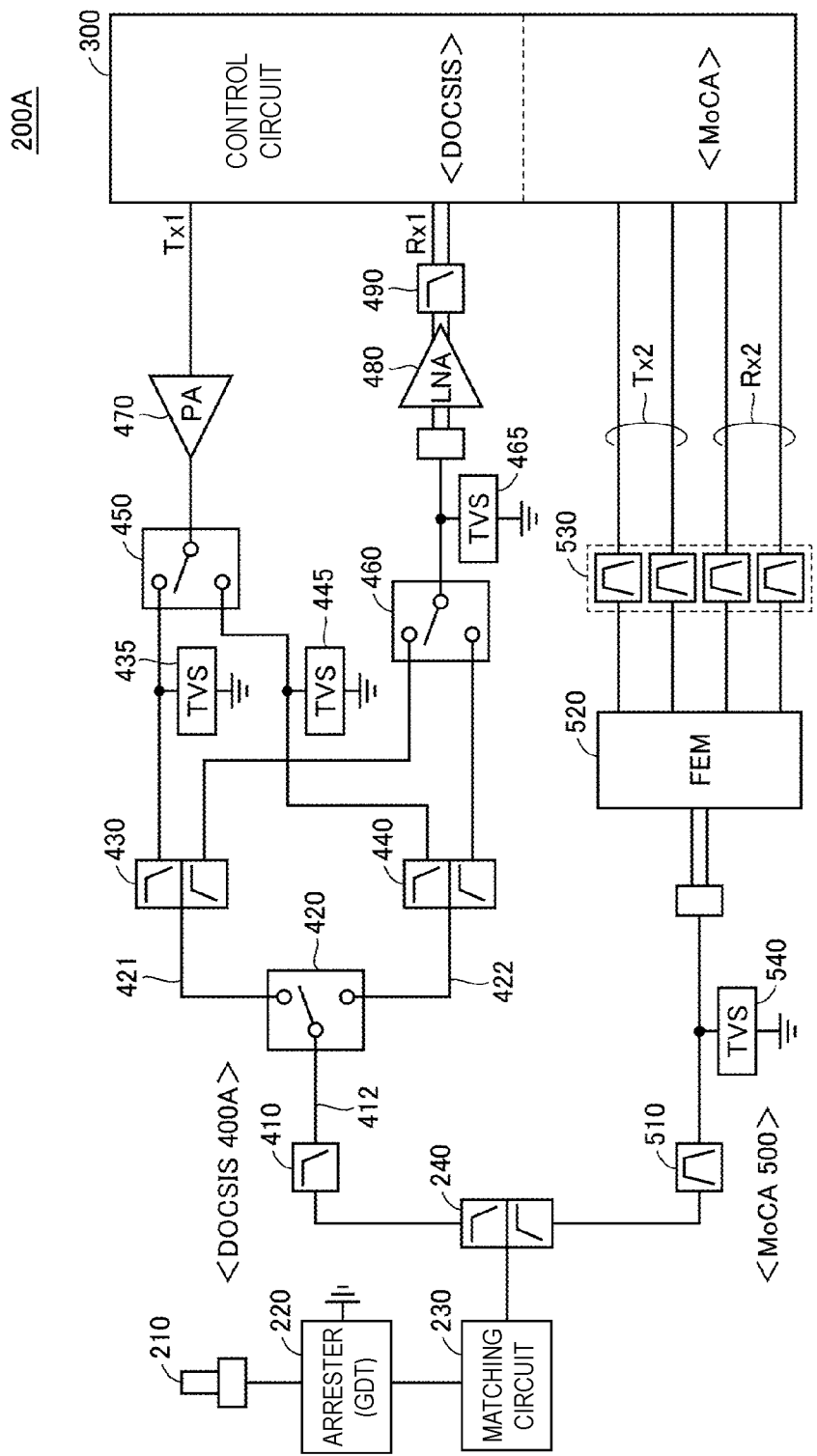
FIG. 2 is a functional block diagram of a STB using a TVS in a comparative example.

FIG. 2 is a diagram illustrating the functional block of a STB 200A known in the related art as a comparative example. The STB 200A has a configuration known in, for example, North America and is typically configured to perform communications in accordance with communication protocols conforming to standards of Data-Over-Cable Service Interface Specification (DOCSIS) and the Multimedia over Coax Alliance (MoCA).

Concerning the DOCSIS standard, there are a plurality of versions due to the improvement of an available frequency band and a communication speed, and a STB conforming to the plurality of versions exists. The STB 200A has a configuration conforming to two versions of the standard that are DOCSIS 3.0 and DOCSIS 3.1.

For example, DOCSIS 3.0 specifies an upstream (transmission) frequency band width from about 5 MHz to about 85 MHz and a downstream (reception) frequency band width from about 108 MHz to about 1002 MHz, while DOCSIS 3.1 specifies an upstream (transmission) frequency band width from about 5 MHz to about 204 MHz and a downstream (reception) frequency band width from about 108 MHz to about 1218 MHz. Note that the lower cutoff frequency of a used frequency band width varies with the apparatus in some cases.

In contrast, MoCA specifies a typical frequency band width from about 1125 MHz to about 1675 MHz. For example, the band width from about 1125 MHz to about 1675 MHz is used when being used together with DOCSIS 3.0, while a band width from about 1350 MHz to about 1675 MHz is used when being used together with DOCSIS 3.1.

In FIG. 2, the STB 200A includes an input/output terminal 210 that receives signals transferred from the CATV station 100, an arrester 220, a matching circuit 230, a filter unit 240, a control circuit 300, a DOCSIS circuit 400A, and a MoCA circuit 500.

The input/output terminal 210 is an F connector, and a coaxial cable is connected to the input/output terminal 210. The input/output terminal 210 delivers and receives signals to and from the CATV station 100 (FIG. 1) through the coaxial cable.

The arrester 220 includes, for example, a gas discharge tube (GDT). The arrester 220 guides, to the ground potential, a lightning surge voltage (for example, about 3 kV to about 5 kV) entering from the input/output terminal 210 through the coaxial cable and prevents an excessive surge voltage from being applied to a circuit subsequent to the arrester 220 in the STB 200A.

The matching circuit 230 is a circuit that matches the impedance on the coaxial cable side and the impedance of the circuit in the STB 200A and includes, for example, an inductor and/or a capacitor (that are not illustrated).

The filter unit 240 is a diplexer including a low pass filter and a high pass filter. The low pass filter extracts, from received signals, signals with frequencies lower than a predetermined upper cutoff frequency and allocates the signals to the DOCSIS circuit 400A. The high pass filter extracts, from the received signals, signals with frequencies higher than a predetermined lower cutoff frequency and allocates the signals to the MoCA circuit 500.

The DOCSIS circuit 400A includes low pass filters 410 and 490, switches 420, 450, and 460, filter units 430 and 440, a power amplifier (PA) 470, and a low noise amplifier (LNA) 480.

The low pass filter 410 allows, among the signals having passed through the filter unit 240, signals with even lower frequencies to pass to a common port 412.

The switch 420 includes a semiconductor switch and performs switchover to connect the common port 412 to one of a first port 421 and a second port 422. The first port 421 is a port that transfers transmission and reception signals in the frequency band widths conforming to DOCSIS 3.0. The second port 422 is a port that transfers transmission and reception signals in the frequency band widths conforming to DOCSIS 3.1. When transmission or reception is performed in the frequency band width conforming to DOCSIS 3.0, the switch 420 causes the common port 412 to connect to the first port 421. When transmission or reception is performed in the frequency band width conforming to DOCSIS 3.1, the switch 420 causes the common port 412 to connect to the second port 422.

The first port 421 is connected to the filter unit 430. The filter unit 430 is a diplexer including a low pass filter and a high pass filter. The low pass filter is a filter that allows a transmitted signal to pass, and the high pass filter is a filter that allows a received signal to pass.

The received signal having passed through the high pass filter of the filter unit 430 is transferred to the LNA 480 via the switch 460. The signal amplified by the LNA 480 is transferred to the control circuit 300 via the low pass filter 490 and a reception port Rx1.

The filter unit 440 is connected to the second port 422. Similar to the filter unit 430, the filter unit 440 is a diplexer including a low pass filter and a high pass filter. The low pass filter is a filter that allows a transmitted signal to pass, and the high pass filter is a filter that allows a received signal to pass.

The received signal having passed through the high pass filter of the filter unit 440 is transferred to the LNA 480 via the switch 460. The signal is amplified and is thereafter transferred to the control circuit 300 via the low pass filter 490 and the reception port Rx1.

The control circuit 300 processes the received signal received from the reception port Rx1 and outputs the received signal to the display device 140 (FIG. 1). The control circuit 300 also processes a signal from the display device 140 and outputs the signal to a transmission port Tx1.

The transmitted signal output from the transmission port Tx1 to the control circuit 300 is amplified by the PA 470 and is transferred to the switch 450. The switch 450 includes a semiconductor switch and transfers the signal received from the control circuit through the transmission port Tx1 to one of the filter unit 430 and the filter unit 440 in accordance with the DOCSIS standard to be used. In the STB 200A in FIG. 2, switchover is performed on the switch 450 to cause the transmitted signal to pass through the switch 450 to the filter unit 430 if transmission is performed in the frequency band width conforming to DOCSIS 3.0, and switchover is performed on the switch 450 to cause the transmitted signal to pass through the switch 450 to the filter unit 440 if transmission is performed in the frequency band width conforming to DOCSIS 3.1.

The transmitted signal transferred to the filter unit 430 passes through the low pass filter of the filter unit 430 and is output from the input/output terminal 210 to the outside of the STB 200A via the switch 420. The transmitted signal transferred to the filter unit 440 passes through the low pass filter of the filter unit 440 and is output from the input/output terminal 210 to the outside via the switch 420.

The MoCA circuit 500 includes a band pass filter 510, a front end module (FEM) 520, and a filter unit 530. The MoCA circuit 500 is a circuit that performs communications in accordance with a communication protocol using time division multiple access (TDMA).

The band pass filter 510 allows, among the received signals having passed through the high pass filter of the filter unit 240, signals in a specific frequency band width to pass and outputs the signals to the FEM 520. The FEM 520 outputs the received signals to two balanced reception ports Rx2 via the band pass filters of the filter unit 530. One of the band pass filters for a corresponding one of the two balanced reception ports Rx2 has a frequency band width for the use of DOCSIS 3.0, and the other band pass filter has a frequency band width for the use of DOCSIS 3.1.

The control circuit 300 processes each signal received from a corresponding one of the reception ports Rx2 and outputs the signal to the display device 140. The control circuit 300 also processes signals from the display device 140 and outputs the signals to two transmission ports Tx2.

Each transmitted signal output to a corresponding one of the transmission ports Tx2 is transferred to the FEM 520 via a corresponding one of the band pass filters of the filter unit 530. Also for the band pass filter for the corresponding transmission port Tx2, the frequency band width is set in accordance with the used DOCSIS standard. The FEM 520 performs time division processing on the transmitted signal and outputs the signal from the input/output terminal 210 to the outside via the filter unit 240.

In the STB 200A including the transmitting and receiving circuit as described above, a high voltage lightning surge of about several kV in an order of magnitude that enters from the coaxial cable is eliminated by the arrester 220 as described above. However, there is a possibility that, for example, a surge voltage of about 700 V passes through the arrester 220 and is transferred as a leakage surge voltage to the transmitting and receiving circuit subsequent to the arrester 220.

The leakage surge voltage might cause dielectric breakdown of apparatuses including the semiconductor switches, such as the switches and the amplifiers (PA and LNA). The STB 200A includes TVSs to protect the apparatus from the leakage surge voltage.

Specifically, in the DOCSIS circuit 400A, to protect the switch 450 and the PA 470, TVSs 435 and 445 are respectively provided on a path connecting the filter unit 430 and the switch 450 and a path connecting the filter unit 440 and the switch 450. To protect the LNA 480, a TVS 465 is provided on a path connecting the switch 460 and the LNA 480.

In the MoCA circuit 500, to protect the FEM 520, a TVS 540 is provided between the band pass filter 510 and the FEM 520.

Note that the band width of a surge wave of the leakage surge voltage is about 100 nsec (that is, about 10 MHz or lower), and thus, it is possible to eliminate the leakage surge voltage in the filter units 430 and 440 to a certain degree. Accordingly, in the circuit in FIG. 2, a TVS is not provided for the switch 460, unlike the switch 450. However, for the LNA 480, the TVS 465 is additionally provided on a path connecting the switch 460 and the LNA 480 because the LNA 480 is typically less resistant to a surge voltage than the switch 460.

Figure 3:
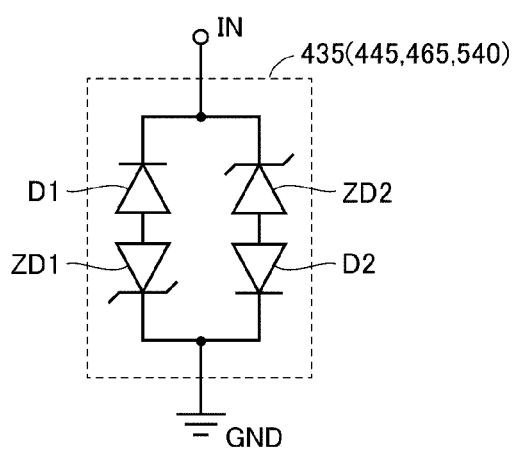
FIG. 3 is a diagram illustrating an example of the circuit configuration of the TVS.

FIG. 3 is a diagram illustrating an example of the circuit configuration of a TVS. In FIG. 3, the TVS preferably is a semiconductor-based ESD protector and includes diodes D1 and D2 and Zener diodes ZD1 and ZD2.

The diode D1 and the Zener diode ZD1 are connected to each other. The cathode of the diode D1 is connected to an input terminal IN, and the cathode of the Zener diode ZD1 is connected to a ground potential GND. The diode D2 and the Zener diode ZD2 are connected to each other. The cathode of the Zener diode ZD2 is connected to the input terminal IN, and the cathode of the diode D2 is connected to the ground potential GND.

With the configuration as described above, protection from a positive surge voltage in the input terminal IN is performed by the Zener diode ZD2, and protection from a negative surge voltage is performed by the Zener diode ZD1.

The semiconductor-based ESD protector as described above has non-linear load characteristics, and thus, using the ESD protector for a high frequency signal might lead to harmonic distortion caused by a harmonic with a frequency that is an integer multiple of the frequency of a passing signal. Accordingly, when the TVS is used, a filter that eliminates harmonic distortion preferably is provided subsequent to the TVS.

In the DOCSIS circuit 400A in FIG. 2, for the TVSs 435 and 445 on the transmission side, the low pass filters of the filter units 430 and 440 define and function as low pass filters that eliminate distortion. For the TVS 465 on the reception side, the low pass filter 490 functions as a low pass filter that eliminates distortion. In the MoCA circuit 500, the band pass filter 510 and the filter unit 530 function as low pass filters that eliminate distortion.

However, in the DOCSIS circuit 400A illustrated in FIG. 2, the switch 420 connected to the common port 412 through which both a transmitted signal and a received signal pass is not provided with a TVS for leakage surge voltage prevention for the following reason.

The use of the TVS as described above leads to harmonic distortion caused by a harmonic with a frequency that is an integer multiple of the frequency of a passing signal. If a frequency band width for transmitted signals and a frequency band width for received signals differ from each other as in the DOCSIS standard, a harmonic of a transmitted signal on the low frequency side might overlap with the frequency band width of a received signal on the high frequency side. In this case, disposing a low pass filter that eliminates harmonic distortion of the transmitted signal on the common port 412 prevents passage of the received signal. Accordingly, in a case of using a semiconductor-based TVS, it is not possible to provide a TVS for leakage surge voltage prevention for the switch 420 connected to the common port 412.

Figure 4:
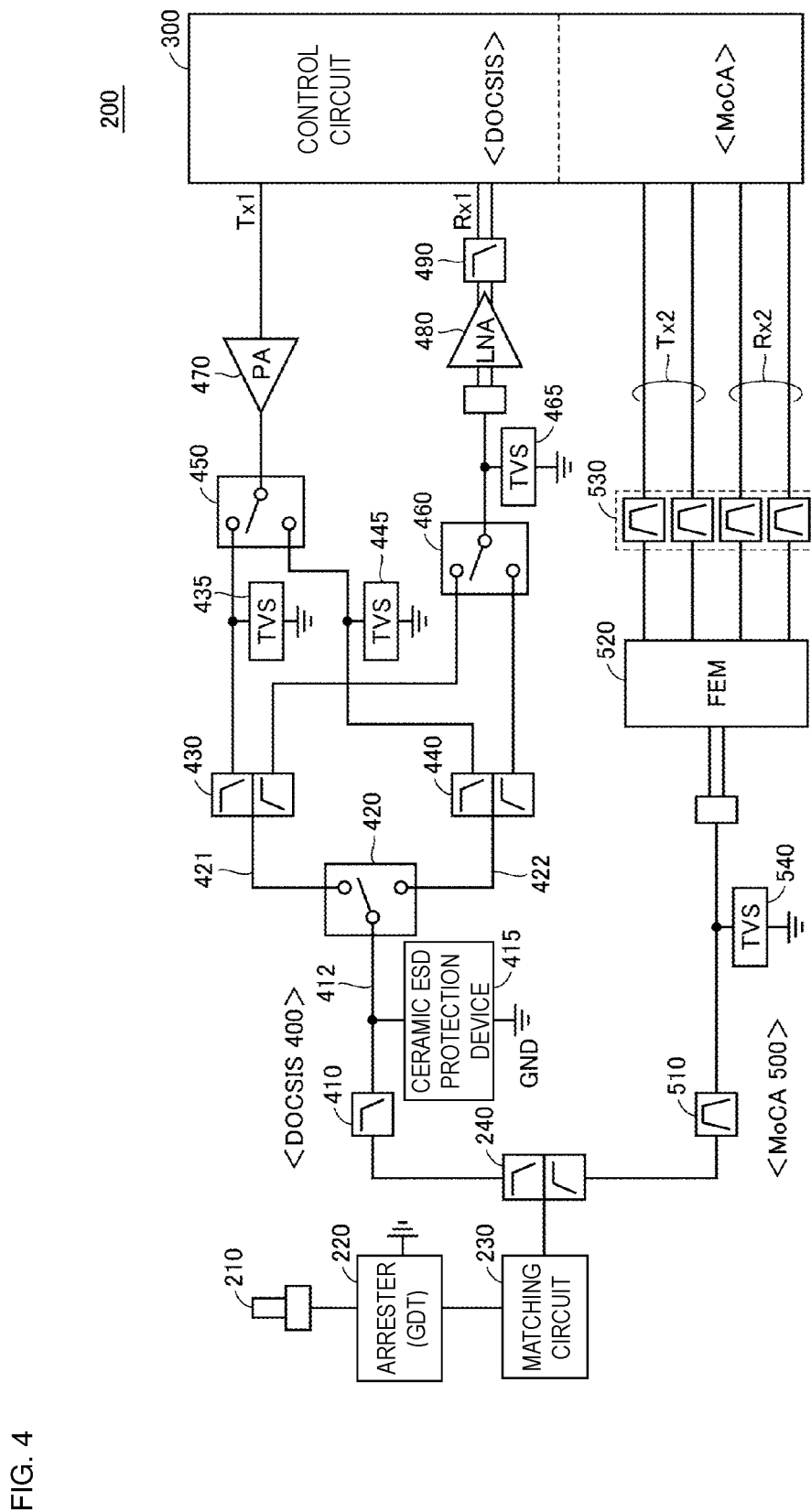
FIG. 4 is a functional block diagram of the STB according to a preferred embodiment of the present invention.

Thus, the STB 200 according to a preferred embodiment of the present invention includes a ceramic-based ESD protector 415 for the common port 412 as illustrated in FIG. 4. Since a ceramic-based ESD protector does not cause harmonic distortion as exhibited in the TVS, a low pass filter that eliminates distortion does not need to be added. Accordingly, even if the ESD protector is provided for the common port 412, it is possible to perform protection from a leakage surge voltage without influencing transmitted and received signals. Note that components in FIG. 4 that are the same as those in FIG. 2 are denoted by the same reference numerals, and explanation of the same components is not repeated.

FIGS. 5 and 6 are diagrams for explaining the ceramic-based ESD protector 415. The ceramic-based ESD protector 415 includes a ceramic body 241, outer electrodes 242 and 243, and inner electrodes 244 and 245.

The ceramic body 241 includes a ceramic layer 241A and a ceramic layer 241B that is laminated such that a space 246 is provided in a portion between the ceramic layer 241A and the ceramic layer 241B. The inner electrodes 244 and 245 are arranged between the ceramic layer 241A and the ceramic layer 241B such that the inner electrodes 244 and 245 are spaced away from and face each other in the space 246.

The outer electrode 242 is provided on one end of the ceramic body 241 and is electrically connected to the inner electrode 244. The outer electrode 243 is provided on the other end of the ceramic body 241 and is electrically connected to the inner electrode 245. The outer electrode 242 is connected to the common port 412 in FIG. 4, and the outer electrode 243 is connected to the ground potential GND.

When a voltage equal to or higher than a predetermined voltage is applied to the common port 412 (that is, the outer electrode 242), an electric discharge from the inner electrode 244 to the inner electrode 245 occurs in the space 246, and current flows to the ground potential GND. This enables protection of the switch 420 from a leakage surge voltage.

FIG. 7 illustrates the magnitude of a leakage surge voltage in the common port 412 in a test in which a surge voltage of about ±6 kV is applied to the input/output terminal 210 in each of the comparative example illustrated in FIG. 2 and the preferred embodiment shown in FIG. 4. It is understood from FIG. 7, that there is a leakage surge voltage of about 700 V in the comparative example, while the leakage surge voltage is reduced to about 330 V in the present preferred embodiment.

FIG. 8 illustrates the levels of a second-order harmonic (about 80 MHz) and a third-order harmonic (about 120 MHz) that are generated subsequent to the ceramic-based ESD protector 415 when a high frequency signal of about 40 MHz, about 20 dBm is input to the input/output terminal 210 in the preferred embodiment shown in FIG. 4. Note that the level of the system noise is about −130 dBm when a signal is not input to the input/output terminal 210. It is thus understood that there is almost no harmonic distortion in the ceramic-based ESD protector 415.

As described above, the use of the ceramic-based ESD protector in a CATV system that transmits and receives signals in a plurality of frequency band widths through coaxial cables enables a semiconductor switch between the frequency band widths to be appropriately protected from a leakage surge voltage without influencing transmitted and received signals.

When a high voltage is applied to an input/output terminal, it is not possible to protect circuit devices due to a leakage surge voltage in some cases. However, as in the present preferred embodiment, a leakage surge voltage is eliminated step by step by using the arrester 220, the ceramic-based ESD protector 415, and the TVSs 435, 445, 465, and 540, and thus it is possible to protect devices of a DOCSIS circuit 400 more appropriately and effectively than in a circuit in the related art.

Note that in FIG. 4, the TVSs 435, 445, and 465 are preferably arranged in the DOCSIS circuit 400 in the same or substantially the same locations as those in FIG. 2. However, if it is possible to eliminate a leakage surge voltage appropriately by using the ceramic-based ESD protector 415, at least one of the TVSs 435, 445, and 465 may be omitted. Alternatively, ceramic-based ESD protectors may be provided, instead of the TVSs 435, 445, and 465. Further, also in the MoCA circuit 500, a ceramic-based ESD protector may be used instead of the TVS 540. The arrester 220, the ceramic-based ESD protector 415, and the TVSs 435, 445, 465, and 540 may be structured to be connected to respective ground potentials.

Note that FIG. 4 illustrates the transmitting and receiving circuit including both the DOCSIS circuit 400 and the MoCA circuit 500. However, the present preferred embodiment is applicable to a transmitting and receiving circuit including only the DOCSIS circuit 400.

Preferred embodiments of the present invention disclosed herein are to be construed as being illustrative and not restrictive in all aspects. It is intended that the scope of the present invention be defined by the scope of claims, not by the description above, and include the meaning equivalent to the scope of claims and any change made within the scope.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transmitting and receiving circuit which transmits and receives signals using a coaxial cable, the transmitting and receiving circuit comprising:
   an input/output terminal that delivers and receives signals;
   a first port that transfers a transmitted signal in a first transmission frequency band width and a received signal in a first reception frequency band width;
   a second port that transfers a transmitted signal in a second transmission frequency band width and a received signal in a second reception frequency band width;
   a first switch including a common port connected to the input/output terminal and that connects to one of the first port and the second port;
   an arrester connected between the input/output terminal and the common port; and
   a first electro-static discharge protector that is ceramic-based and connected between a ground potential and a path connecting the arrester and the common port.

2. The transmitting and receiving circuit according to claim 1, further comprising:
   a transmission port that transfers a transmitted signal;
   a reception port that transfers a received signal;
   a second switch that connects the transmission port to one of the first port and the second port; and
   a second electro-static discharge protector that is semiconductor-based and connected between the ground potential and a path connecting the first switch and the second switch.

3. The transmitting and receiving circuit according to claim 2, further comprising:
   a third switch that connects the reception port to one of the first port and the second port; and
   a third electro-static discharge protector that is semiconductor-based and connected between the ground potential and a path connecting the reception port and the third switch.

4. The transmitting and receiving circuit according to claim 2, further comprising:
   a first filter unit that allows the transmitted signal in the first transmission frequency band width to pass through the first filter unit and output the transmitted signal to the first port, the transmitted signal being included in transmitted signals from the transmission port, the first filter unit also allowing the received signal in the first reception frequency band width to pass through the first filter unit and output the received signal to the reception port, the received signal being included in signals from the first port; and
   a second filter unit that allows the transmitted signal in the second transmission frequency band width to pass through the second filter unit and output the transmitted signal to the second port, the transmitted signal being included in transmitted signals from the transmission port, the second filter unit also allowing the received signal in the second reception frequency band width to pass through the second filter unit and output the received signal to the reception port, the received signal being included in signals from the second port.

5. The transmitting and receiving circuit according to claim 2, wherein
the second electro-static discharge protector includes:
an input terminal;
an output terminal connected to the ground potential;
a first diode and a first Zener diode that include respective anodes that are connected to each other; and
a second diode and a second Zener diode that include respective anodes that are connected to each other;
a cathode of the first diode and a cathode of the second Zener diode are connected to the input terminal; and
a cathode of the second diode and a cathode of the first Zener diode are connected to the output terminal.

6. The transmitting and receiving circuit according to claim 1, wherein
the first electro-static discharge protector includes:
a first electrode;
a second electrode connected to the ground potential;
a first ceramic layer; and
a second ceramic layer laminated on the first ceramic layer such that a space is provided in a portion between the first ceramic layer and the second ceramic layer;
the first electrode and the second electrode are arranged between the first ceramic layer and the second ceramic layer such that the first electrode and the second electrode are spaced away from and face each other in the space; and
when a voltage equal to or higher than a predetermined voltage is applied to the first electrode, current flows from the first electrode to the second electrode.

7. The transmitting and receiving circuit according to claim 1, wherein
the transmitting and receiving circuit is included in a set top box for cable television;
the first transmission frequency band width and the first reception frequency band width are frequency band widths conforming to a standard that is Data-Over-Cable Service Interface Specification (DOCSIS) 3.0; and
the second transmission frequency band width and the second reception frequency band width are frequency band widths conforming to a standard that is DOCSIS 3.1.

8. The transmitting and receiving circuit according to claim 1, wherein the input/output terminal is an F connector and is connected to the coaxial cable.

9. The transmitting and receiving circuit according to claim 1, wherein the arrester includes a gas discharge tube.

10. The transmitting and receiving circuit according to claim 1, further comprising a matching circuit that performs impedance matching between an input side and an output side.

11. The transmitting and receiving circuit according to claim 1, further comprising a diplexer including a low pass filter and a high pass filter that filters the signals.

12. The transmitting and receiving circuit according to claim 1, wherein the first switch is a semiconductor switch.

13. The transmitting and receiving circuit according to claim 2, wherein the second switch is a semiconductor switch.

14. The transmitting and receiving circuit according to claim 3, wherein the third switch is a semiconductor switch.

15. The transmitting and receiving circuit according to claim 4, wherein the first filter unit is a diplexer including a low pass filter and a high pass filter, and the second filter unit is a diplexer including a low pass filter and a high pass filter.

16. A set top box for a cable tv system comprising the transmitting and receiving circuit according to claim 1.

17. A cable tv system comprising the set top box according to claim 16.

18. The cable tv system according to claim 17, further comprising a hybrid fiber coaxial system.

* * * * *